United States Patent [19]

Zimring

[11] Patent Number: 4,557,599
[45] Date of Patent: Dec. 10, 1985

[54] CALIBRATION AND ALIGNMENT TARGET PLATE

[75] Inventor: Bruce Zimring, Costa Mesa, Calif.

[73] Assignee: General Signal Corporation, Stamford, Conn.

[21] Appl. No.: 586,704

[22] Filed: Mar. 6, 1984

[51] Int. Cl.[4] .......................... G01J 1/14; G01B 11/27
[52] U.S. Cl. ...................................... 356/243; 29/583; 33/286; 83/522; 125/13 R; 356/73; 356/401; 358/101
[58] Field of Search ............... 356/124, 150, 243, 399, 356/400, 401, 73; 358/101; 250/252.1; 350/535; 83/520, 522; 33/286, 293; 29/574, 583, 148, DIG. 102; 364/559; 73/1 R; 125/13 R, 21

[56] References Cited

U.S. PATENT DOCUMENTS

| | | | |
|---|---|---|---|
| 1,630,146 | 5/1927 | Trenner | 350/435 |
| 1,688,824 | 10/1928 | Miessner | 369/56 |
| 2,039,231 | 4/1936 | Lindner | 33/125 A |
| 2,660,091 | 11/1953 | McCallum | 350/535 |
| 3,674,004 | 7/1972 | Grandia et al. | 125/16 R |
| 3,789,507 | 2/1974 | Murray, Jr. | 33/1 SD |
| 4,023,911 | 5/1977 | Julesz et al. | 350/132 X |
| 4,055,376 | 10/1977 | Daberko | 350/507 |
| 4,126,376 | 11/1978 | Gommel et al. | 356/399 X |
| 4,167,174 | 9/1979 | Hampton et al. | 125/13 R |
| 4,170,158 | 10/1979 | Weaver | 83/522 |
| 4,183,614 | 1/1980 | Feldman | 350/535 |
| 4,233,625 | 11/1980 | Altman | 356/400 X |
| 4,255,056 | 3/1981 | Peterson | 356/401 |
| 4,276,698 | 7/1981 | Dore et al. | 33/174 L |
| 4,281,342 | 7/1981 | Ueda et al. | 356/399 X |
| 4,328,553 | 5/1982 | Fredriksen et al. | 356/400 X |
| 4,353,087 | 10/1982 | Berry et al. | 358/101 |
| 4,385,838 | 5/1983 | Nakazawa et al. | 356/399 |

OTHER PUBLICATIONS

Miller, "Dual-Television Photomask Alignment and Exposure System", IBM Technical Disclosure Bulletin, vol. 14, No. 11, Apr. 1972.

*Primary Examiner*—Vincent P. McGraw
*Assistant Examiner*—Robert D. V. Thompson, III
*Attorney, Agent, or Firm*—Barnes & Thornburg

[57] ABSTRACT

A target plate is provided in the operating field of view of a microscopic operating system having a plurality of target patterns thereon. These target patterns include scaled rulings, to which an operating element of the system is aligned, and reflective portions for calibrating the optical elements of the system to assure even illumination of the field of view and minimal distortion. Additional target patterns include centerline rulings which intersect at right angles for calibration of Theta alignment of an operating element, and at least one matte surface for examination of the pattern recognition capability to determine contrast and video information quality. At least one checkerboard pattern of alternating reflective and non-reflective surfaces and at least one continuously reflective surface may be provided to calibrate distortion, focus, illumination, and contrast.

20 Claims, 2 Drawing Figures

CALIBRATION AND ALIGNMENT TARGET PLATE

Background and Summary of the Invention

The present invention relates generally to precision optical alignment systems and, more particularly, to wafer dicing saws having automatic optical, mechanical, and electrical position alignment means.

Product die on semiconductor wafers are typically arranged in rectilinear grid patterns. The spacings between adjacent rows or columns of dice are referred to as "streets". In many cases die and street dimensions are constant over the entire surface of the wafer. Individual die are typically separated from the wafer by dicing saws which are centered down the streets. Where streets are know to have a constant or known width, such dicing saws can be provided with position control systems to "step" or move the dicing edge to adjacent street locations. The increment of each step is set according to known die, street, and dicing edge widths with the intention of avoiding cutting through portions of the die itself.

Wafer handling and die dicing have become increasingly automated. Automatic alignment and position control systems for wafer dicing saws typically rely on direct optical alignment, video camera or electronic scanning, mechanical or electromechanical positioning drives, or a combination of these elements. Each element can introduce a degree of error into the alignment system. For eample, X, Y, and Theta axes orientations of the dicing edge with respect to the mounting chuck and the wafer thereon are often set by mechanical lead screws. No matter how well made, there will always be some given amount of fluctuation and error in fabrication of the lead screws. As product die and the streets therebetween become smaller and smaller through improved production techniques, the allowable margin for error in lead screws also decreases.

The microscopic optical systems for monitoring wafer patterns and the dicing edge in relation thereto may also introduce alignment errors. Video cameras, for example, are typically calibrated without the microscopic lens which is used in the wafer optical system. Contrast, distortion, height, beam convergence, focus, lighting level, and image splitter adjustments, if done with any significant precision at all, have usually been made using studio techniques. These studio techniques involve, for example, focusing and calibrating on dark painted patterns overlaying a white wall. Other optical adjustments are made with respect to a single lighted bulb moving through the field of view in front of the white wall. However, this optical environment is significantly different from that experienced in microscopic lens settings. As a result, studio calibrated video systems are not precisely aligned and calibrated for microscopic wafer monitoring.

For example, a single illumination source, while suitable for some macroscopic operations, is often inadequate on the microscopic level. Due to large differences in contrast and reflectivity for different types of semiconductor wafers, single lamp illumination cannot guarantee sufficient resolution required for alignment. However, when using dual illumination sources, care must be taken to balance the illumination evenly over the operating field of view.

Previous attempts to compensate for such errors and recalibrate automatic alignment systems for wafer dicing in a microscopic setting have involved making an initial cut on the product wafer. Various realignments and adjustments of the optical monitoring and mechanical positioning elements are then made with respect to this initial cut. However, this simplistic approach permits only limited recalibration accuracy. Further, it does not provide the opportunity for complete recalibration of many important factors and entails some risk of damage to product dice.

In other environments scaled rulings, grated patterns, and reflective surfaces have been employed in the field of view of the microscopic optical lens systems. However, these devices will typically permit only elementary focussing, rather than a detailed calibration of the optical environment. Further, while scaled rulings may be employed to measure or define features of the object or workpiece, these rulings are not employed to align operating elements which act on the object and are controlled by the optical lens system.

It is therefore an object of the present invention to provide an improved means of calibrating and aligning optical, mechanical, and electrical elements.

Another object of the present invention is the provision of a target pattern in the operating field of view of a microscopic operating system.

A further object is to provide a method of recalibrating wafer dicing saws to compensate for inherent errors in stepping control and drive systems.

Still another object is the provision of a means for accurately calibrating and aligning optical elements in a microscopic system to minimize distortion, provide an evenly illuminated field of view and improve focus, resolution, contrast, and linearity.

Yet still another object is to provide a target pattern for calibration of a wafer dicing saw to an automatic alignment system, and of a video monitor camera to a wafer dicing saw and its associated alignment system, as well as for testing and alignment of a variety of mechanical control and drive elements employed in a wafer dicing alignment system.

Yet still even another object is the provision of an alignment and calibration pattern suitable for use with a variety of different automatic operating systems.

These and other objects of the present invention are attained in the provision of a target plate in the operating field of view of a microscopic operating system having a plurality of target patterns thereon. These target patterns include scaled rulings, to which an operating element of the system is aligned, and reflective portions for calibrating the optical elements of the system to assure even illumination of the field of view and minimal distortion. Additional target patterns include centerline rulings which intersect at right angles for calibration of Theta alignment of an operating element, and at least one matte surface for examination of the pattern recognition capability to determine contrast and video information quality. At least one checkerboard pattern of alternating reflective and non-reflective surfaces and at least one continuously reflective surface may be provided to calibrate distortion, focus, illumination, and contrast.

A method of recalibrating automatic wafer dicing apparatus to compensate for inherent mechanical errors is also provided. Using the target pattern of the present invention, the wafer dicing edge is first aligned with a given scaled ruling and then stepped a predetermined number of increments away, according to the stepping control system. Comparing the actual edge position on the ruling with the intended position will reveal the magnitude of inherent error for the predetermined increment. The control system can then be adjusted to compensate for this error.

Other objects, advantages and novel features of the present invention will become apparent from the following detailed description of the invention when considered in conjunction with the accompanying drawings.

DETAILED DESCRIPTION OF THE DRAWINGS

Figure 1:
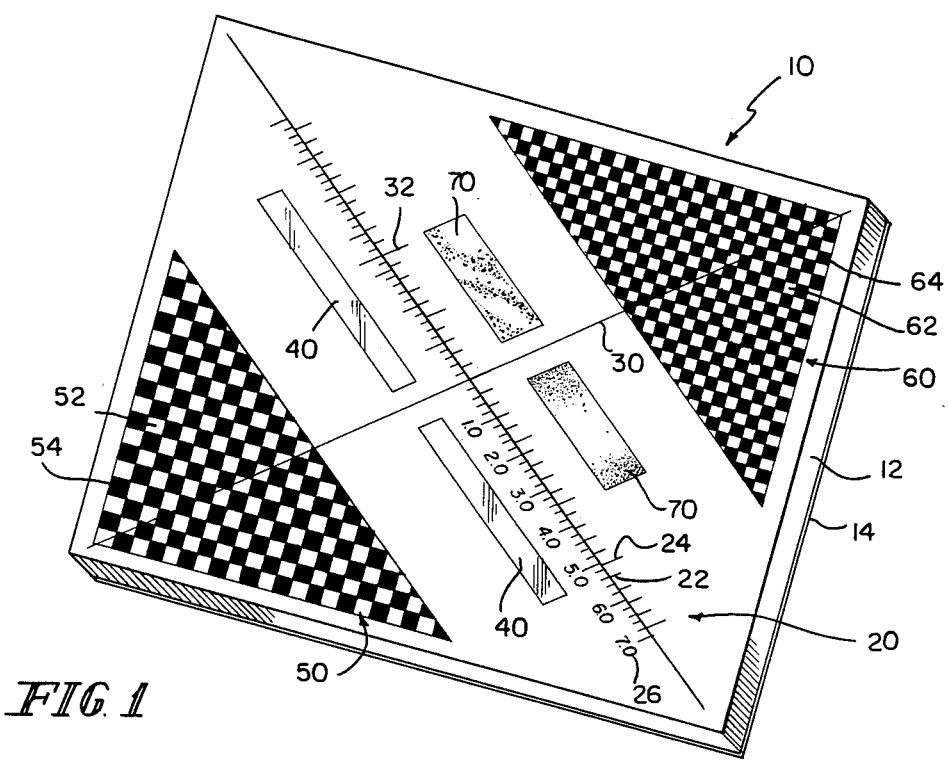
FIG. 1 shows a top plan view of a target plate embodying the principles of the present invention.

FIG. 1, which illustrates a preferred em bodiment of the present invention, shows a target plate 10 having a plurality of optical targets thereon. The targets include scaled ruling 20, centerline ruling 30, reflective regions 40, checkerboard patterns 50 and 60, and matte surface regions 70. In wafer dicing applications, plate 10 is positioned at the wafer supporting chuck in the microscopic field of view of the optical and video control elements.

Plate 10 includes a substrate 12 preferably formed from glass material, such as fused silica. The target rulings, scale figures, and non-reflective portions are then applied to substrate 12 by photolithographic techniques for example. The reflective portions are preferably chromed surfaces applied to substrate 12 by vacuum deposition. Opaque layer 14 is applied to the back of substrate 12 to help protect substrate 12 from scratches. Opaque layer 14 also prevents reflections from the underlying chuck surface from interfering with optical and video calibrations.

Scaled ruling 20 is a linear, diagonal line having tic marks 22 formed at regular intervals along that line. Longer tic marks 24 and scale figures 26 are used to denote major divisions. Preferably, metric and English scales of measurement are employed on opposite sides of ruling 20. Increments separating tic marks 22 may, for example, be 100 microns and 10 mils, respectively. Major divisions are likewise indicated at 1.0 cm and 0.1 inch increments. The accuracy of both scales can be verified with measurements traceable to the U.S. National Bureau of Standards.

Centerline ruling 30 is a linear, diagonal line intersecting scaled ruling 20 at right angles over the "0" center of the tic mark scales. A shorter, right angle intersection is also preferably formed by line 32 on scaled ruling 20. Line 32 is an extension onto both sides of scaled ruling of the longer tic mark associated with the 1.50 inch (or its metric equivalent) major division.

A plurality of reflective or mirrored regions 40 are provided on either side of centerline ruling 30. While the precise dimensions of reflective regions 40 are not necessarily critical, they should at least be large enough to fill the optical or video operating field of view of the chuck monitoring system, as detailed further hereinbelow. It is preferable to have the reflectivity be uniform and equal over the entire surface of both regions 40.

Checkerboard pattern 50 includes an alternating series of adjacent reflective and non-reflective surfaces 52 and 54, respectively. Likewise, checkerboard pattern 60 includes alternating reflective and non-reflective surfaces 62 and 64, respectively. Preferably the dimensions of surfaces 52 and 54 differ from the dimensions of surfaces 62 and 64. For example, surfaces 52 and 54 may form squares having sides of 10 ml., while surfaces 62 and 64 may form squares having sides of 5 ml.

Matte surface regions 70 present patterns of minute, random discrete reflective and non-reflective surface configurations. As described hereinbelow, these surfaces provide a means of determining the pattern recognition capability of the chuck monitoring system. Preferably, these regions are applied to the surface of substrate 12 by means of adhesive-backed tape. The upper tape surface includes, for example, a polycarbonate material on a mylar substrate having chrome paint embedded therein. Scotch Adhesive No. 467 has been found to be suitable for securing the tape to substrate 12.

Figure 2:
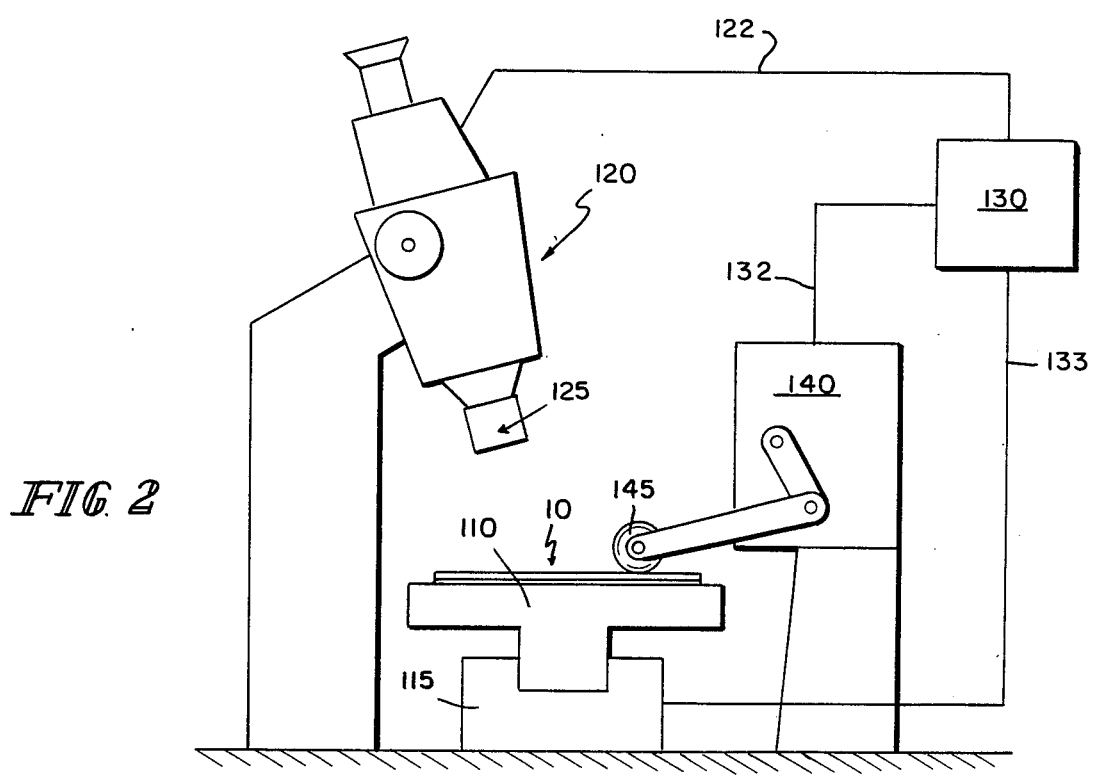
FIG. 2 shows a block diagram of a microscopic operating system employing the target plate of FIG. 1.

Target plate 10 is a versatile calibration and alignment tool which may be employed directly on work supporting chucks in the microscopic field of view of the operating and monitoring elements of automatic operating systems. Suitable operating systems include, as shown in block diagram form in FIG. 2, automatic wafer dicing saw apparatus. Target plate 10 is positioned on wafer support chuck 110. Direct viewing optics and video camera optical electronics are typically contained in a single optical assembly 120 having microscopic lens assembly 125 forming the optical element. When positioned on chuck 110, target plate 10 is in the field of view of lens assembly 125. Output signals from the video camera optical electronics in optical assembly 120 are supplied to dicing control unit 130 over line 122. Control unit 130 monitors and directs motion of dicing saw assembly 140 through signals along line 132. Saw stepping assembly 140 includes blade or dicing edge 145 which may be directed against wafers positioned on chuck 110. Control unit 130 may also monitor and direct chuck operation by signals through line 133 to chuck control unit 115. Mechanical and electromechanical drive elements may be employed in optical ssembly 120, saw assembly 140, and chuck control unit 115.

A single target plate according to the present invention may be employed both with saw systems having a variety of wafer sizes and operating capacities, as well as with saw systems having different control programming. For example, target plate 10 will provide calibration and alignment assistance with the "602", "1006", "1010" and "1100" saw systems commercially available from Micro Automation, a unit of the assignee of the present invention. The same target plate 10 is useful for saw systems employing "MicroEye I" and "MicroEye II" Auto Alignment Systems, also commercially available from Micro Automation.

In the above-mentioned wafer dicing saw systems, target plate 10 is used for calibrating microscopic adjustments to direct viewing optical elements, video camera optical electronics, and mechanical and electromechanical drive elements. For example, in a "MicroEye I" arrangement, an "Ultricon" ("Ultracon is a registered TM of RCA) video camera apparatus may be employed. Such a camera is a commercially available device which includes means to adjust beam, focus, height, dual illumination level, and image splitter orientation. Both binocular and monocular direct viewing is permitted. Target plate 10 is, preferably, positioned on the wafer supporting chuck. Beam, focus height, and image splitter linearity is adjusted by positioning checkerboard patterns 50 or 60 in the binocular field of view. Auto Aligner linearity is adjusted by placing reflective region 40 in the binocular image splitter field of view. Further, Y and Theta axes memories are adjusted by placing the intersection of scaled ruling 20 and centerline ruling 30 in the monocular field of view.

As a further example of the flexibility of the present invention, the same target plate 10 may be used to calibrate "1006", "1010" and "1100" saw systems using "MicroEye II" arrangements. Again, target plate 10 is positioned on the wafer supporting chuck. Theta axis correction alignment is made by positioning the intersection of scaled ruling 20 and centerline ruling 30 in the monocular field of view. Optics calibration is made by positioning reflective region 40 in the image splitter field of view to attain even illumination. Positioning checkerboard patterns 50 and 60 in that field of view permits minimizing of distortion. The "MicroEye II" system can be checked by positioning matte region 70 in the field of view; a picture quality reading of between 6500 and 7000 is a quick indication that the system is probably in good order.

Further, the Y axis stepping of such dicing saw systems can be recalibrated by positioning scaled ruling 20 in the field of view. The optical reticle or dicing saw edge is first centered at a give tic mark, preferably the centerline ruling/scaled ruling intersection. This element is then stepped along scaled ruling 20 a predetermined number of increments according to the previous calibration of the stepping control system. Inaccuracies in this control system calibration will be apparent by comparison of the actual reticle or saw edge position along scaled ruling 20 with the location the control system should have brought to it. The control system may be then readjusted, and a second Y axis stepping test run to verify the new calibration Preferably, the intersection of scaled ruling 20 and centerline ruling 30 is at the center of target piece 10. With the "1006", "1010", and "1100 " systems, target plate 20 may be centered on the wafer supporting chuck. Rotation of the chuck will rotate target plate 10 during recalibration. With the "602" system, it is not necessary to center target plate 10 on the chuck. Measurements may be taken by aligning the intersection of scaled ruling 20 and line 32 with the chuck center.

In the embodiment shown in FIG. 1, scaled ruling 20 and centerline ruling 30 are diagonally positioned with respect to rectangular target plate 10. However, the present invention specifically contemplates various other non-diagonal positional arrangements for these intersecting rulings.

From the preceding description of the preferred embodiments, it is evident that the objects of the present invention are attained. Although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A target plate, for precision calibration and alignment of a wafer handling and semiconductor die cutting operating system having optical elements which define a microscopic operating field of view with respect to an operating element for die cutting, comprising a target pattern in said operating field of view having a plurality of substantially coplanar optical targets thereon, at least one of which targets includes a scaled ruling to which said operating element of said system is aligned, and at least two of said coplanar optical targets include reflective means for calibrating said optical elements of said system to assure an evenly illuminated field of view with a minimum of distortion by optical comparison of said two coplanar optical targets.

2. The apparatus according to claim 1 wherein one of said optical targets includes a center line ruling intersecting said scaled ruling at right angles for calibration of rotational alignment of said operating element.

3. The apparatus according to claim 1 wherein one of said operating system further includes pattern recognition means and said optical target includes a matte surface region for examination by said pattern recognition means to determine a measure of contrast and the quality of video information.

4. The apparatus according to claim 1 wherein said coplanar optical targets include a checkerboard pattern of alternating reflective and non-reflective surfaces.

5. An apparatus for calibration and alignment of microscopic optical and video camera systems controlling semiconductor wafer handling devices, comprising a target plate to be disposed in the microscopic field of view of said systems and having a plurality of spaced apart microscopic checkerboard patterns each of alternating reflective and non-reflective surfaces.

6. The apparatus according to claim 5 wherein said target plate includes a plurality of pairs of said checkerboard patterns, each of said pairs of patterns having different alternating section dimensions.

7. The apparatus according to claim 6 wherein said target plate includes at least one continuously reflective area for calibration of light distribution within the field of view and picture contrast quality.

8. The apparatus according to claim 5 wherein said target plate further includes a matte pattern for examination by a pattern recognition system to determine video picture quality.

9. The apparatus according to claim 7 wherein said matte pattern is formed by a polycarbonate material on a mylar surface having chrome embedded therein.

10. The apparatus according to claim 5 wherein said target plate includes linear rulings thereon for measuring structural alignment of operational elements positionally controlled by said optical and camera systems.

11. The apparatus according to claim 10 wherein linear rulings include precision scaled rulings having tic marks provided at increments of a predetermined value.

12. The apparatus according to claim 10 wherein each of said patterns is provided on a common optical plane in the microscopic field of view.

13. A chuck-mountable optical calibration and alignment plate for use with wafer dicing means controlled by microscopic auto-alignment means comprising:
  center line rulings intersecting at right angles for calibration of rotational accuracy;
  at least one pair of coplanar checkerboard regions of alternating reflective and non-reflective sections for calibration and alignment of control optics elements; and
  at least one pair of coplanar reflective regions for calibration of microscopic optical lighting distribution.

14. The chuck-mounted calibration and alignment plate according to claim 13 wherein one of said centerline rulings is scaled for calibration of Y stepping of said dicing means.

15. The apparatus according to claim 13 including a plurality of pairs of said checkerboard regions each of said pairs having different alternating section dimensions.

16. The apparatus according to claim 13 further including at least one region for calibration of pattern recognition systems.

17. A method of recalibrating automatic wafer dicing means to compensate for inherent errors introduced by stepping control systems comprising:
providing a calibration plate, having plurality of coplanar precision rulings thereon spaced apart by a given increment, on the wafer supporting chuck;
initially aligning the dicing edge of said wafer dicing means with one of said rulings and then stepping said dicing edge a predetermined number of said increments along the rulings according to said stepping control system;
determining the stepping control system error, as defined by the difference between the actual positiiton of said dicing edge along the rulings and the desired position, as indicated by moving said predetermined number of said increments from the initially aligned ruling; and
readjusting said stepping control system so as to compensate for said error.

18. A method of recalibrating automatic wafer dicing means, having optical elements which define a microscopic operating field of view and a wafer supporting chuck in said operating field of view, comprising:
positioning a target plate, having a plurality of coplanar optical targets, on said wafer supporting chuck;
locating said optical elements with respect to said wafer supporting chuck such that said operating field of view is directed onto a first reflective region of said optical targets, and adjusting said optical elements to define even illumination over said field of view; and
relocating said optical elements with respect to said wafer supporting chuck such that said operating field of view is directed onto a second, checkerboard pattern of alternating reflective and non-reflective regions of said optical targets, and adjusting said optical elements to improve focus and minimize distortion over said field of view.

19. The method of recalibration according to claim 18, wherein said automatic wafer dicing means further includes an operating element which is stepwise positional over the surface of said wafer supporting chuck, and wherein the magnitude of said stepwise movement is recalibrated by relocating said optical elements with respect to said wafer supporting chuck such that said operating field of view is directed onto a third, scaled ruling portion of said optical targets.

20. A method of aligning a support surface with respect to a microscopic operating tool and optically calibrating a microscopic field of view for optical elements controlling said operating tool, comprising:
positioning a target plate on said support surface, said target plate having a plurality of spaced apart uniformly reflective portions and a plurality of spaced apart checkerboard portions of alternating reflective and non-reflective regions, and said optical elements including binocular image splitter means;
locating said optical elements with respect to said support surface such that said plurality of reflective positions is aligned with the field of view of said binocular image splitter means, and adjusting said optical elements and orientation of said support surface to define even illumination over said field of view; and
locating said optical elements with respect to said support surface such that said plurality of checkerboard portions is aligned with the field of view of said binocular image splitter means, and adjusting said optical elements and orientation of said support surface to minimize distortion over said field of view.

* * * * *